United States Patent
Blanchard et al.

(10) Patent No.: US 10,532,631 B2
(45) Date of Patent: Jan. 14, 2020

(54) ACOUSTIC AIR DUCT AND AIR EXTRACTION SYSTEM INCLUDING A PLURALITY OF CHANNELS HAVING AN EXPANSION CHAMBER

(71) Applicant: FORD GLOBAL TECHNOLOGIES, LLC, Dearborn, MI (US)

(72) Inventors: Patrick James Blanchard, Ann Arbor, MI (US); Haibo Zhao, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 155 days.

(21) Appl. No.: 15/473,120

(22) Filed: Mar. 29, 2017

(65) Prior Publication Data
US 2018/0281563 A1    Oct. 4, 2018

(51) Int. Cl.
B60H 1/24    (2006.01)
B60H 1/00    (2006.01)

(52) U.S. Cl.
CPC ......... B60H 1/248 (2013.01); B60H 1/00564 (2013.01); B60H 2001/006 (2013.01)

(58) Field of Classification Search
CPC ............... B60H 1/248; B60H 1/00564; B60H 2001/006
USPC ........................................................ 454/162
See application file for complete search history.

(56) References Cited

U.S. PATENT DOCUMENTS

| | | | |
|---|---|---|---|
| 1,888,711 A * | 11/1932 | Bourne | F24F 7/013 |
| | | | 181/257 |
| 2,297,046 A * | 9/1942 | Bourne | F01N 1/006 |
| | | | 110/184 |
| 2,853,932 A * | 9/1958 | Freydl | B60H 1/248 |
| | | | 454/164 |
| 3,194,341 A * | 7/1965 | Haag | F01N 1/084 |
| | | | 181/256 |
| 3,696,883 A | 10/1972 | Devane | |
| 3,819,009 A | 6/1974 | Motsinger | |
| 4,167,986 A | 9/1979 | Conway | |
| 4,287,962 A | 9/1981 | Ingard et al. | |
| 4,362,223 A | 12/1982 | Meier | |
| 4,667,770 A | 5/1987 | Devane | |

(Continued)

FOREIGN PATENT DOCUMENTS

| | | |
|---|---|---|
| CN | 103743082 B | 4/2014 |
| CN | 205279396 U | 6/2016 |

(Continued)

OTHER PUBLICATIONS

English Machine Translation of CN103743082A.

(Continued)

*Primary Examiner* — Gregory L Huson
*Assistant Examiner* — Dana K Tighe
(74) *Attorney, Agent, or Firm* — Vichit Chea; King & Schickli, PLLC

(57) ABSTRACT

An air extraction system for a motor vehicle includes a trim panel inlet, an air extractor and an acoustic air duct extending from the trim panel inlet to the air extractor. The acoustic air duct includes an outer wall defining an elongated internal airflow passageway and a plurality of channels. Those channels extend along the airflow passageway within the outer wall. At least one of the channels has an expansion chamber.

10 Claims, 4 Drawing Sheets

(56) References Cited

U.S. PATENT DOCUMENTS

| | | | |
|---|---|---|---|
| 4,712,644 A * | 12/1987 | Sun | F01N 1/003 181/251 |
| 5,162,622 A | 11/1992 | Malmsten | |
| 5,198,625 A | 3/1993 | Boria | |
| 5,979,583 A | 11/1999 | Amino et al. | |
| 6,521,193 B1 | 2/2003 | Hijikata et al. | |
| 7,117,973 B2 * | 10/2006 | Graefenstein | F01N 1/06 181/253 |
| D581,335 S | 11/2008 | Contreras | |
| 7,464,560 B2 | 12/2008 | Nishino et al. | |
| 7,562,742 B2 | 7/2009 | Gilliland et al. | |
| 8,061,476 B2 | 11/2011 | Corin | |
| 8,146,706 B2 | 4/2012 | Katoh et al. | |
| 8,166,775 B2 | 5/2012 | Choi | |
| 8,240,427 B2 | 8/2012 | Jangili et al. | |
| 8,425,284 B2 | 4/2013 | MacDonald et al. | |
| 8,439,159 B1 | 5/2013 | Boria | |
| 9,243,543 B2 | 1/2016 | Bertrand et al. | |
| 2004/0185765 A1 | 9/2004 | Yamaguchi et al. | |
| 2005/0252714 A1 | 11/2005 | Goda et al. | |
| 2007/0128997 A1 | 6/2007 | Prince et al. | |
| 2008/0223652 A1 | 9/2008 | Dyck et al. | |
| 2008/0233856 A1 | 9/2008 | Okawa et al. | |
| 2009/0088064 A1 | 4/2009 | Lin | |
| 2010/0071991 A1 * | 3/2010 | Ono | F02M 35/10144 181/229 |
| 2011/0162901 A1 | 7/2011 | Lucas et al. | |
| 2012/0273298 A1 | 11/2012 | Seryi | |
| 2014/0339013 A1 | 11/2014 | Koizumi | |
| 2016/0355071 A1 | 12/2016 | Yerke et al. | |
| 2018/0237143 A1 * | 8/2018 | Bombled | B64D 13/02 |

FOREIGN PATENT DOCUMENTS

| | | |
|---|---|---|
| DE | 102007060435 B3 | 4/2009 |
| DE | 102010008344 A1 | 8/2011 |
| EP | 0122255 B1 | 1/1987 |
| JP | H0715482 U | 3/1995 |
| JP | 2009202692 A | 9/2009 |
| JP | 2014084015 A | 5/2014 |
| KR | 20040065885 A | 7/2004 |
| KR | 100765270 B1 | 10/2007 |

OTHER PUBLICATIONS

English Machine Translation of CN205279396U.
English Machine Translation of DE102007060435B3.
English Machine Translation of DE102010008344A1.
English Machine Translation of JP2009202692A.
English Machine Translation of JP2014084015A.
English Machine Translation of JPH0715482U.
English Machine Translation of KR100765270B1.
English Machine Translation of KR20040065885A.
Office Action dated May 20, 2019 for U.S. Appl. No. 15/473,172, filed Mar. 29, 2017.
Office Action dated Jan. 17, 2019 for U.S. Appl. No. 15/473,172, filed Mar. 29, 2017.
Office Action dated Jan. 9, 2019 for U.S. Appl. No. 15/473,015, filed Mar. 29, 2017.
Office Action dated Apr. 17, 2019 for U.S. Appl. No. 15/473,015, filed Mar. 29, 2017.

* cited by examiner

ACOUSTIC AIR DUCT AND AIR EXTRACTION SYSTEM INCLUDING A PLURALITY OF CHANNELS HAVING AN EXPANSION CHAMBER

TECHNICAL FIELD

This document relates generally to the motor vehicle equipment field and, more particularly, to a new and improved air extraction system, a new and improved acoustic air duct as well as a new and improved method of reducing noise transmitted through an air duct.

BACKGROUND

A motor vehicle air extraction system provides a number of functions, allowing proper air flow inside a passenger cabin of a motor vehicle, controlling window fogging and even reducing door closing effort. Such an air extraction system incorporates an inlet such as a trim panel inlet, an air extractor and an air duct connecting the trim panel inlet to the air extractor.

In order to accommodate a desired airflow inside the passenger cabin, that air duct is ideally designed to have a large diameter and no expansion chamber. In order to control noise, vibration and harshness (NVH), that air duct is ideally designed to have a small diameter and an expansion chamber. This document relates to a new and improved acoustic air duct and a new and improved air extraction system uniquely designed and adapted to meet these seemingly conflicting requirements. A related method of reducing noise transmitted through an air duct is also provided.

SUMMARY

In accordance with the purposes and benefits described herein, an acoustic air duct is provided. That acoustic air duct comprises an outer wall defining an elongated internal airflow passageway and a plurality of channels. The plurality of channels extend along the airflow passageway within the outer wall. At least one channel of the plurality of channels has an expansion chamber.

That at least one channel may have a frustoconical inlet end. That frustoconical inlet end may include an axial inlet port. The frustoconical inlet end may include a first frustoconical wall extending around the axial input port and at least one supplemental inlet port in the first frustoconical wall.

The at least one channel of the acoustic air duct may also have a frustoconical outlet end. That frustoconical outlet end may include an axial outlet port. Further, the frustoconical outlet end may include a second frustoconical wall extending around the axial outlet port and at least one supplemental outlet port in the second frustoconical wall.

In some of the many possible embodiments, the at least one channel may have a helical configuration so as to provide a tortuous path to further reduce noise transmission through the acoustic air duct.

In any of the possible embodiments of the acoustic air duct, the plurality of channels may be made from an acoustic material. Such material serves to reduce NVH and particularly the transmission of sound through the acoustic air duct.

In accordance with an additional aspect, an air extraction system is provided for a motor vehicle. That air extraction system comprises an air inlet, such as a trim panel inlet, an air extractor and an acoustic air duct extending from the trim panel inlet to the air extractor. The acoustic air duct may include an outer wall defining an elongated internal airflow passageway and a plurality of channels. That plurality of channels extends along the airflow passageway within the outer wall. At least one channel of the plurality of channel has an expansion chamber.

The at least one channel of the acoustic air duct of the air extraction system may have a frustoconical inlet end including an axial inlet port. The frustoconical inlet end may further include a first frustoconical wall extending around the axial inlet port and at least one supplemental inlet port in the first frustoconical wall.

The at least one channel may have a frustoconical outlet end including an axial outlet port. The frustoconical outlet end may include a second frustoconical wall extending around the axial outlet port and at least one supplemental outlet port in the second frustoconical wall.

In any of the many possible embodiments of the air extraction system, the plurality of channels of the acoustic air duct may be made from an acoustic material in order to minimize the transmission of noise.

In accordance with still another aspect, a method is provided of reducing noise transmitted through an air duct. That method comprises the step of dividing an internal airflow passageway in the air duct with a plurality of channels wherein at least one channel of the plurality of channels has an expansion chamber.

The method may further include the step of providing the at least one channel with a frustoconical inlet end including an axial inlet port and a frustoconical outlet end including axial outlet port. Further, the method may include the step of providing a supplemental inlet port in a first frustoconical wall of the frustoconical inlet end and a supplemental outlet port in the second frustoconical wall of the frustoconical outlet end.

Still further, the method may include the step of making the plurality of channels from an acoustic material. In addition, the method may include the step of extending the air duct from an air inlet, such as a trim panel inlet, to an air extractor so as to thereby provide a new and improved air extraction system.

In the following description, there are shown and described several preferred embodiments of the acoustic air duct, air extraction system and related method of reducing noise transmitted through an air duct. As it should be realized, the acoustic air duct, the air extraction system and the related method are capable of other, different embodiments and their several details are capable of modification in various, obvious aspects all without departing from the acoustic air duct, air extraction system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the acoustic air duct, air extraction system and related method of reducing noise transmitted through an air duct and together with the description serve to explain certain principles thereof.

FIG. 4b is a detailed and elevational view of the frustoconical outlet end of one of the channels of the acoustic air duct embodiment illustrated in FIG. 4a.

Reference will now be made in detail to the present preferred embodiments of the acoustic air duct, the air extraction system and the related method of reducing noise transmitted through an air duct, examples of which are illustrated in the accompanying drawing figures.

DETAILED DESCRIPTION

Figure 1:
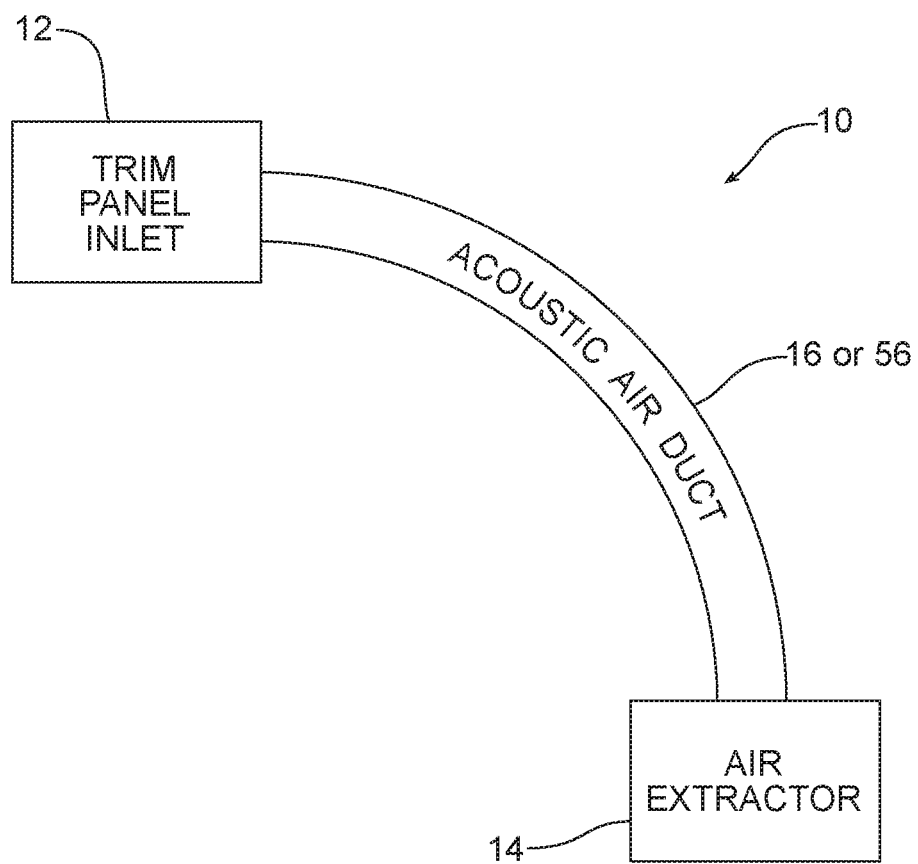
FIG. 1 is a schematic block diagram of the new and improved air extraction system which incorporates the new and improved acoustic air duct.

Reference is now made to FIG. 1 which schematically illustrates the new and improved air extraction system 10. That air extraction system 10 includes an air inlet, illustrated as a trim panel inlet 12. The trim panel inlet 12 is located in the passenger compartment of the motor vehicle such as, for example, in the package tray. The air extraction system 10 also includes an air extractor 14 which is typically provided in the sheet metal at the rear of the motor vehicle. In addition, the air extraction system 10 includes an acoustic air duct 16 or 50 that extends from the trim panel inlet 12 to the air extractor.

Figure 2:
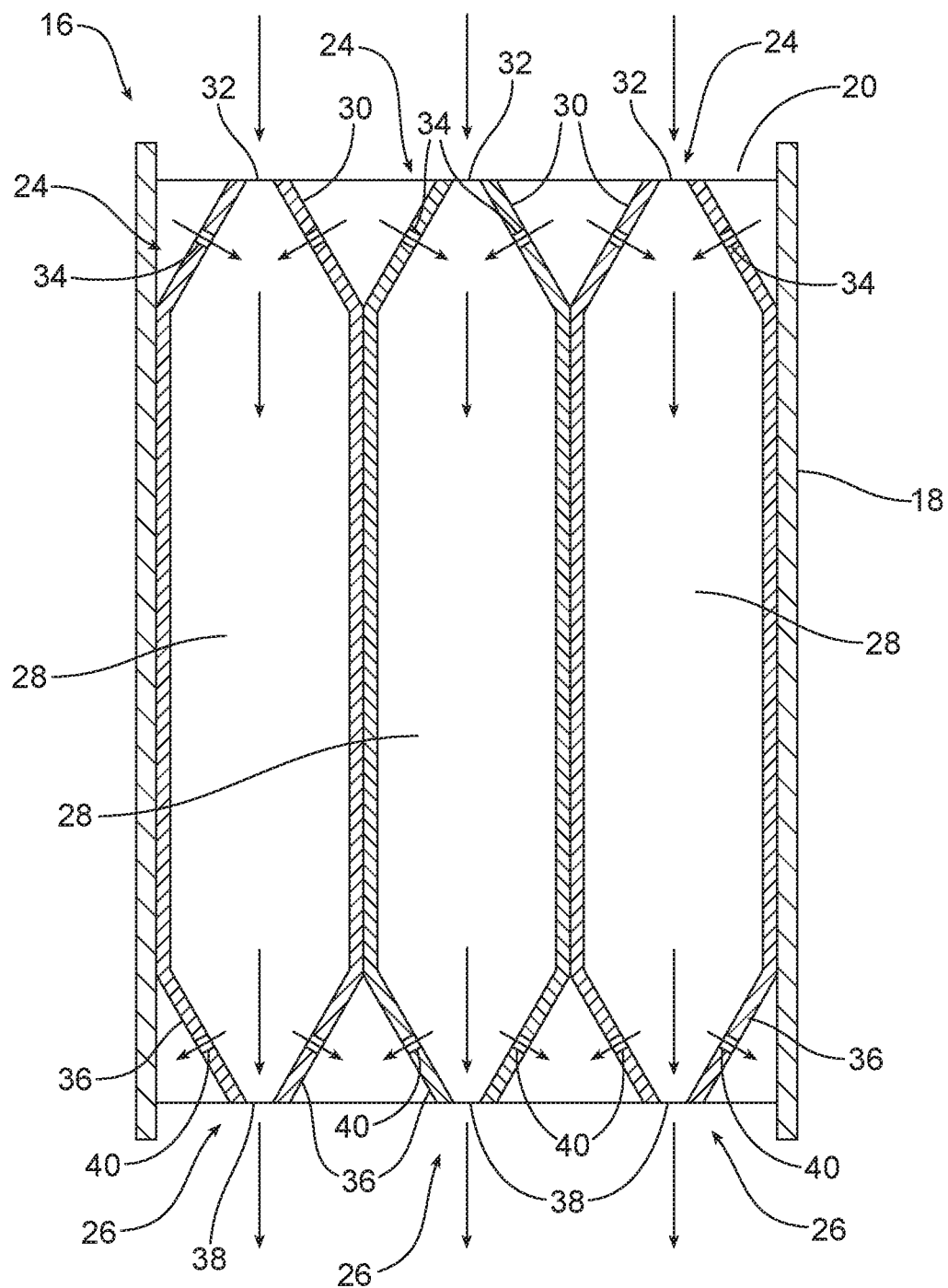
FIG. 2 is a detailed longitudinal cross sectional view illustrating a segment of the new and improved acoustic air duct.
Figure 3:
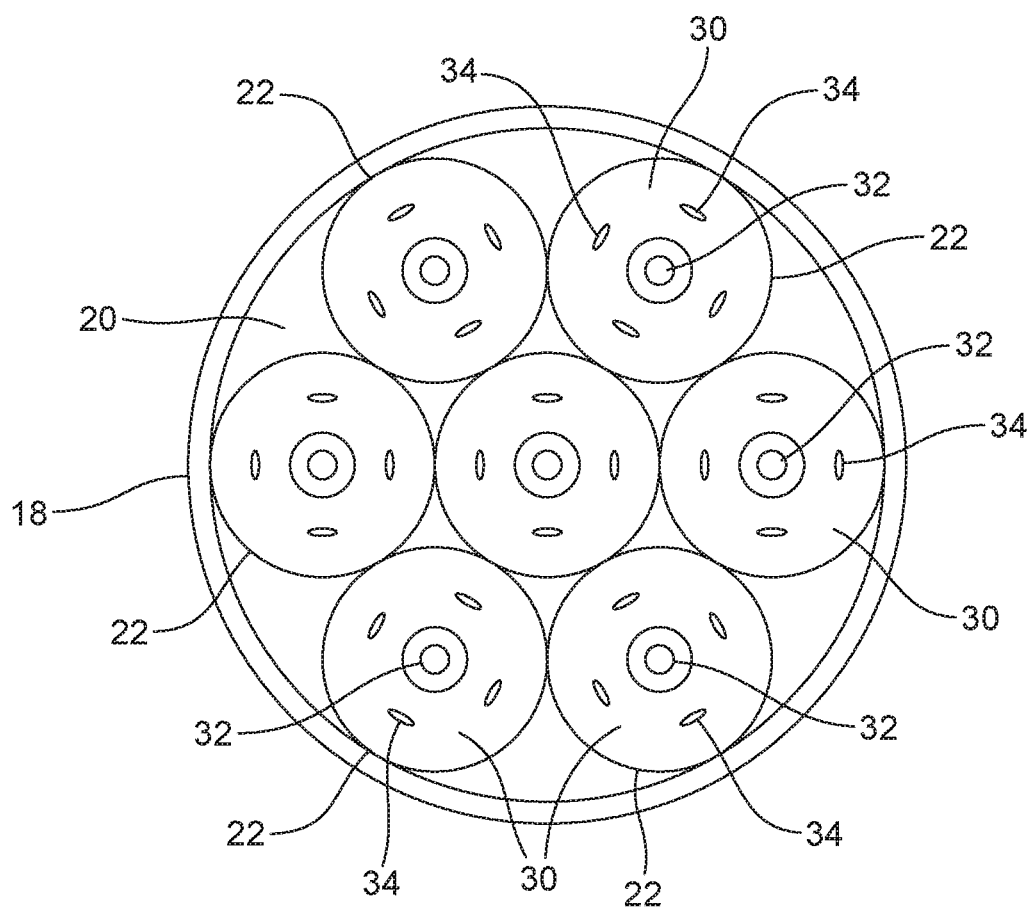
FIG. 3 is an end view of the new and improved acoustic air duct illustrated in FIG. 2.

As illustrated in FIGS. 2 and 3, the acoustic air duct 16 includes an outer wall 18 defining an elongated internal airflow passageway 20. A plurality of channels 22 extends along the airflow passageway 20 within the outer wall 18.

As best illustrated in FIG. 2, at least one channel 22 (and in this embodiment all three channels shown in FIG. 2) have a frustoconical inlet end 24, a frustoconical outlet end 26 and an expansion chamber 28 between the frustoconical inlet end and the frustoconical outlet end. More specifically, each frustoconical inlet end 24 includes a first frustoconical wall 30 extending around an axial inlet port 32. At least one supplemental inlet port 34 is provided in the first frustoconical wall 30. In the embodiment illustrated in FIG. 3, four supplemental inlet ports 34 are provided at equally spaced locations around the first frustoconical wall 30. Further, a total of seven channels 22 are shown.

As best illustrated in FIG. 2, each frustoconical outlet end includes a second frustoconical wall 36 extending around an axial outlet port 38. At least one supplemental outlet port 40 is provided in the second frustoconical wall 36. Two supplemental outlet ports 40 are illustrated in the second frustoconical wall 36 in FIG. 2. One, two, three, four or more supplemental outlet ports 40 may be provided if desired.

As air flows through the airflow passageway 20 in the acoustic air duct 16, that air passes through the axial inlet ports 32 and supplemental inlet ports 34 in the first frustoconical wall 30 of the frustoconical inlet end 24 of each channel 22, then passes through the various expansion chambers 28 before passing through the axial outlet port 38 and supplemental outlet ports 40 in the second frustoconical wall 36 of the frustoconical outlet end 26 of the acoustic air duct. This air movement through the various expansion chambers 28 of the channels 22 substantially reduces NVH thereby reducing any transmission of noise through the air duct 16. Significantly, this is done without compromising airflow through the passenger compartment of the motor vehicle since the airflow passageway 20 provides a predetermined cross sectional area necessary to meet body leakage requirements for providing reduced door closing effort and optimal airflow in the passenger compartment so as to allow efficient and effective performance of the heating, ventilation and air conditioning (HVAC) system. The resulting well ventilated, reduced noise environment enhances the satisfaction of the motor vehicle operator.

Figure 4A:
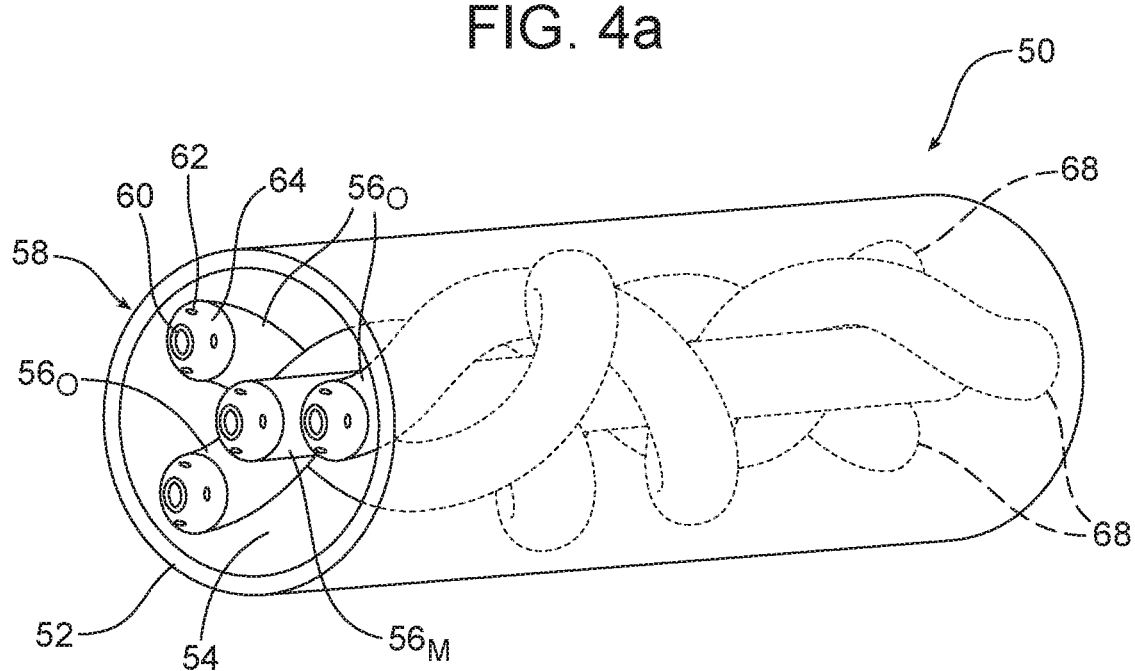
FIG. 4a is a schematic perspective view illustrating an alternative embodiment of acoustic air duct incorporating a plurality of channels wherein at least one of the plurality of channels has a helical configuration.
Figure 4B:
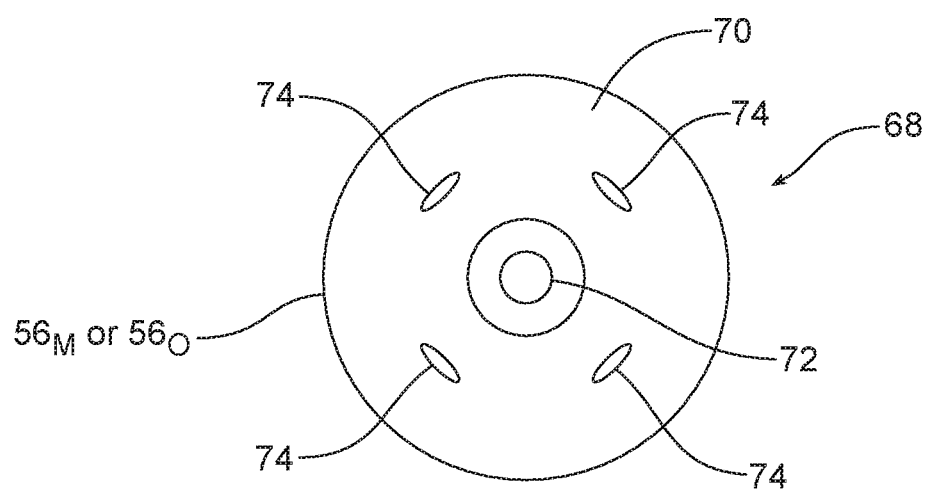

Reference is now made to FIGS. 4a and 4b illustrating an alternative embodiment of acoustic air duct 50. That acoustic air duct 50 includes an outer wall 52 defining an airflow passageway 54. The airflow passageway 54 is divided by a plurality of channels $56_M$ and $56_O$. Each of the airflow channels $56_M$ and $56_O$ includes a frustoconical inlet end 58 having an axial inlet port 60 and a plurality of supplemental inlet ports 62 in the first frustoconical wall 64 of the frustoconical inlet end 58. Air flows through the axial inlet port 60 and supplemental inlet ports 62 into the expansion chamber (not shown) located upstream from the frustoconical outlet end 68 of each channel 56. As shown in FIG. 4b, that frustoconical outlet end 68 includes a second frustoconical wall 70 having an axial outlet port 72 and a plurality of supplemental outlet ports 74 radially arrayed around the axial outlet port 72.

In the embodiment illustrated in FIGS. 4a and 4b, the middle channel $56_M$ is straight while the outer three channels $56_O$ axially arrayed around the middle channel are helical in configuration. Only three helical outer channels $56_O$ are shown for purposes of clarity of illustration. Here it should be appreciated that more may be provided so as to effectively fill the airflow passageway 54. As should be appreciated, the helical configuration of the outer channels 56 provides a tortuous path to further reduce noise transmission through the acoustic air duct 50 as air passes into and through the various expansion chambers 66 of those channels.

In any of the many possible embodiments such as those illustrated, the walls of the various channels 22, 56 may be made from an acoustic material. Examples of acoustic materials that may be utilized include but are not necessarily limited to polyurethane, a plastomer such as ethylene-alpha olefin copolymers and a polyester such as polytetrafluoroethylene (PET). Such materials absorb sound and further reduce sound transmission through the acoustic air duct 16, 50 as well as any air extraction system 10 incorporating such an air duct. The outer wall 18, 52 may also be made from such an acoustic material if desired. The plurality of channels 22, 56 may be made integral with the outer wall 18, 52 such as by co-extrusion therewith or the plurality of channels may be provided by a separate partition body that is secured within the outer wall. Additive manufacturing may also be used.

Consistent with the above description, a method is also provided for reducing noise transmitted through an air duct 16, 50. That method comprises dividing an internal airflow passageway 20, 54 in the air duct 16, 50 with a plurality of channels 22, 56 wherein at least one channel of the plurality of channels has an expansion chamber 28, 66.

The method may further include the step of providing the at least one channel with a frustoconical inlet end 24 or 58 including an axial inlet port 32, 60 and a frustoconical outlet end 26, 68 including an axial outlet port 38, 72.

The method may further include the step of providing a supplemental inlet port 34, 62 in the first frustoconical wall 30, 64 of the frustoconical inlet end 24, 58 and a supplemental outlet port 40, 74 in the second frustoconical wall 36, 70 of the frustoconical outlet end 26, 68.

In addition, the method may include making those plurality of channels 22, 56 from an acoustic material. Further, the method may include extending the air duct 16, 50 from an air inlet, such as a trim panel inlet 12, to an air extractor 14 as illustrated in FIG. 1 in order to form an air extraction system 10 for a motor vehicle. Such an air extraction system 10 functions to allow proper air flow through a passenger cabin of the motor vehicle while at the same time diminishing NVH for a quieter ride.

The foregoing has been presented for purposes of illustration and description. It is not intended to be exhaustive or to limit the embodiments to the precise form disclosed. Obvious modifications and variations are possible in light of the above teachings. For example, while the channels 22, 56 in the illustrated embodiments all have circular cross sections, it should be appreciated that substantially any shape may be used including, for example, circular, elliptical, polygonal, square, rectangular and hexagonal. The cross sections may be regular or irregular and may even be a combination of different shapes and/or different dimensions. All such modifications and variations are within the scope of the appended claims when interpreted in accordance with the breadth to which they are fairly, legally and equitably entitled.

What is claimed:

1. An acoustic air duct, comprising:
   an outer wall defining an elongated internal airflow passageway; and
   a plurality of channels extending along said elongated internal airflow passageway within said outer wall, at least one channel of said plurality of channels having (a) an expansion chamber and (b) a frustoconical inlet end including an axial inlet port, a first frustoconical wall extending around said axial inlet port and at least one supplemental inlet port in said first frustoconical wall.

2. The acoustic air duct of claim 1, wherein said at least one channel has a frustoconical outlet end.

3. The acoustic air duct of claim 2, wherein said frustoconical outlet end includes an axial outlet port.

4. The acoustic air duct of claim 3, wherein said frustoconical outlet end includes a second frustoconical wall extending around said axial outlet port and at least one supplemental outlet port in said second frustoconical wall.

5. The acoustic air duct of claim 4, wherein said at least one channel has a helical configuration so as to provide a tortuous path to further reduce noise transmission through said acoustic air duct.

6. The acoustic air duct of claim 1, wherein said plurality of channels are made from an acoustic material.

7. An air extraction system for a motor vehicle, comprising:
   a trim panel inlet;
   an air extractor; and
   an acoustic air duct extending from said trim panel inlet to said air extractor, said acoustic air duct including an outer wall defining an elongated internal airflow passageway and a plurality of channels extending along said airflow passageway within said outer wall, at least one channel of said plurality of channels having an expansion chamber and a frustoconical inlet end including an axial inlet port, a first frustoconical wall extending around said axial inlet port and at least one supplemental inlet port in said first frustoconical wall.

8. The air extraction system of claim 7, wherein said at least one channel has a frustoconical outlet end including an axial outlet port.

9. The air extraction system of claim 8, wherein said frustoconical outlet end includes a second frustoconical wall extending around said axial outlet port and at least one supplemental outlet port in said second frustoconical wall.

10. The air extraction system of claim 7, wherein said plurality of channels are made from an acoustic material.

* * * * *